United States Patent [19]
Finley

[11] Patent Number: 6,131,981
[45] Date of Patent: Oct. 17, 2000

[54] SHELVES FOR VEHICULAR UTILITY BODIES

[76] Inventor: Alfred L. Finley, 2201 Hidden Creek Rd., Ft. Worth, Tex. 76107

[21] Appl. No.: 09/064,906

[22] Filed: Apr. 23, 1998

[51] Int. Cl.[7] .................................................. B60P 3/00
[52] U.S. Cl. .................. 296/37.6; 211/187; 211/90.02; 312/348.3
[58] Field of Search .................... 296/37.6, 24.1; 312/348.3, 350; 211/187, 184, 90.02; 108/42, 44, 106, 107

[56] References Cited

U.S. PATENT DOCUMENTS

| | | | |
|---|---|---|---|
| 152,136 | 6/1874 | MacConnell | 211/184 X |
| 2,471,337 | 5/1949 | Luby | 296/24.1 |
| 2,820,687 | 1/1958 | Waring | 108/42 X |
| 2,905,480 | 9/1959 | Giovannelli | 296/24.1 X |
| 3,326,595 | 6/1967 | Ogilvie | 296/37.6 |
| 3,556,306 | 1/1971 | Shelf | 211/187 X |
| 3,929,371 | 12/1975 | Gibosn | 296/24.1 X |
| 4,073,556 | 2/1978 | Wilson, Jr. | 312/350 X |
| 5,267,773 | 12/1993 | Kalis, Jr. et al. | 296/37.6 |

*Primary Examiner*—D. Glenn Dayoan
*Assistant Examiner*—Chad D Wells

[57] ABSTRACT

A compartmented utility body for use with a vehicle is provided with shelving for the compartments. The shelving is formed of fiberglass in a poltrusion process and includes shelf panels having front and rear walls integral therewith. The panels and walls are provided with convex molded-in strips having notches therein. The shelves are mounted on mounting strips secured to the compartment walls, and vertical dividers are positioned in the slots of the convex strips.

4 Claims, 2 Drawing Sheets

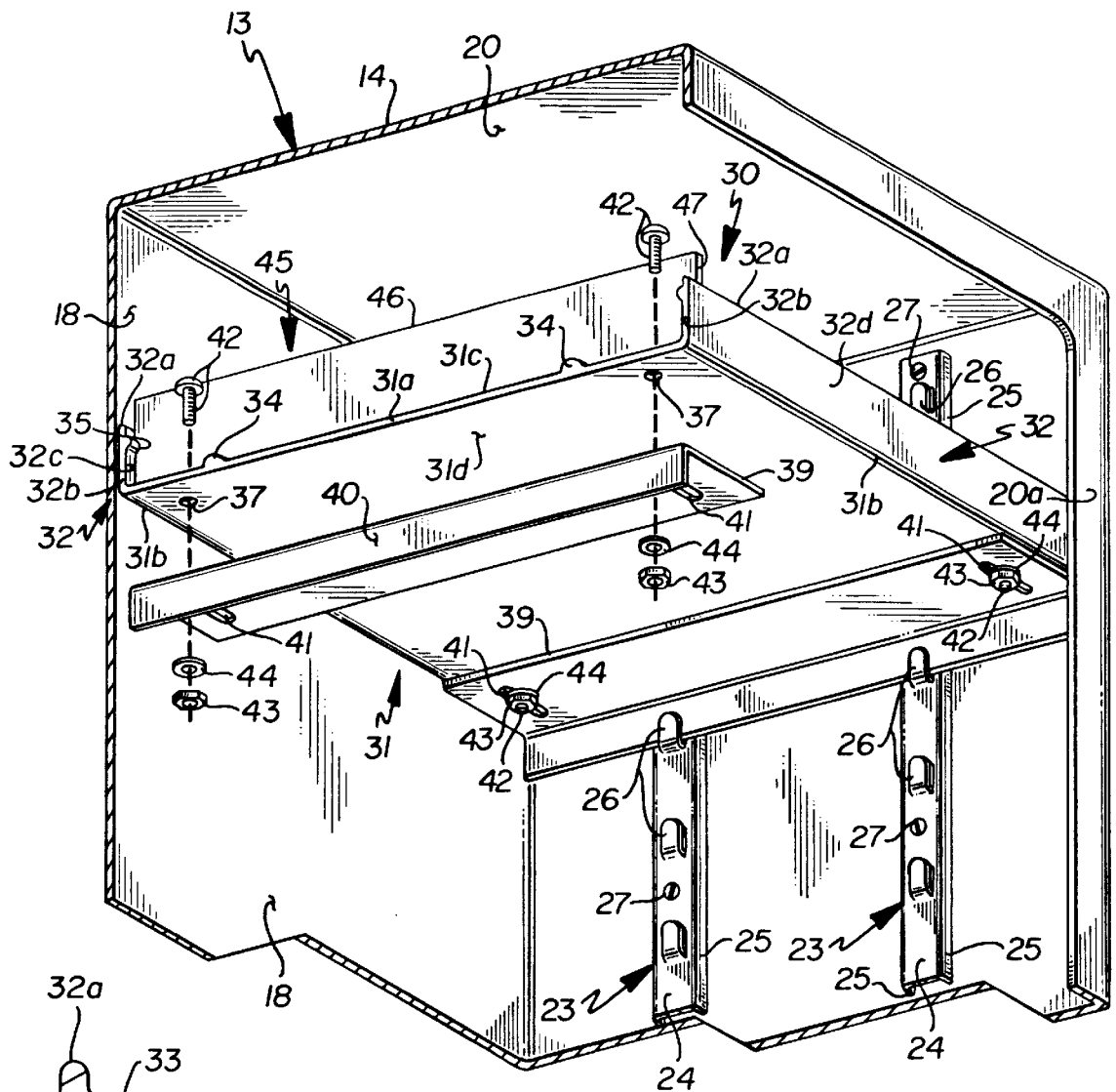
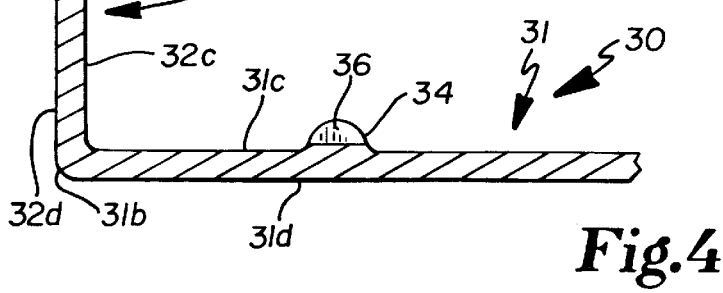
Fig. 3
Fig. 4

SHELVES FOR VEHICULAR UTILITY BODIES

FIELD OF THE INVENTION

This invention relates to utility bodies for vehicles and more particularly to shelving for utility bodies.

BACKGROUND OF THE INVENTION

Commercially manufactured pick-up trucks are routinely converted into utility vehicles by attaching utility bodies to the pick-up truck box. Utility bodies are provided with compartments for containing various tools, supplies and other materials needed for a particular utility work to be performed. Shelf assemblies for these compartments is desirable and especially shelves which may be changed into subcompartments of different sizes and configurations.

SUMMARY OF THE INVENTION

An object of this invention is to provide shelf assemblies for compartments of utility bodies in which the shelves may be adjusted to change the compartment into subcompartments of different sizes and configurations.

Another object of this invention is to provide shelf assemblies for utility body compartments in which the shelves includes vertical dividers which may vary in size and shape.

The shelf assemblies includes a plurality of similar shelves formed of fiberglass in a poltrusion process. Each shelf includes a substantially flat horizontal panel having vertical front and rear walls integral therewith. The panel and walls of each shelf have molded-in convex strips provided with slots that accommodate the vertical dividers. The slotted strips not only position and retain the dividers on the shelves but the strips also impart rigidity to and strengthen the shelves.

BRIEF DESCRIPTION OF THE FIGURES OF THE DRAWING

FIG. 3 is a cross-sectional view taken approximately along line 3—3 of FIG. 1 and looking in the direction of the arrows and with certain parts exploded to show the relationship of the various components; and, FIG. 4 is a cross-sectional view taken approximately along line 4—4 of FIG. 2 and looking in the direction of the arrows.

DESCRIPTION OF THE PREFERRED EMBODIMENT

Figures 1, 2:
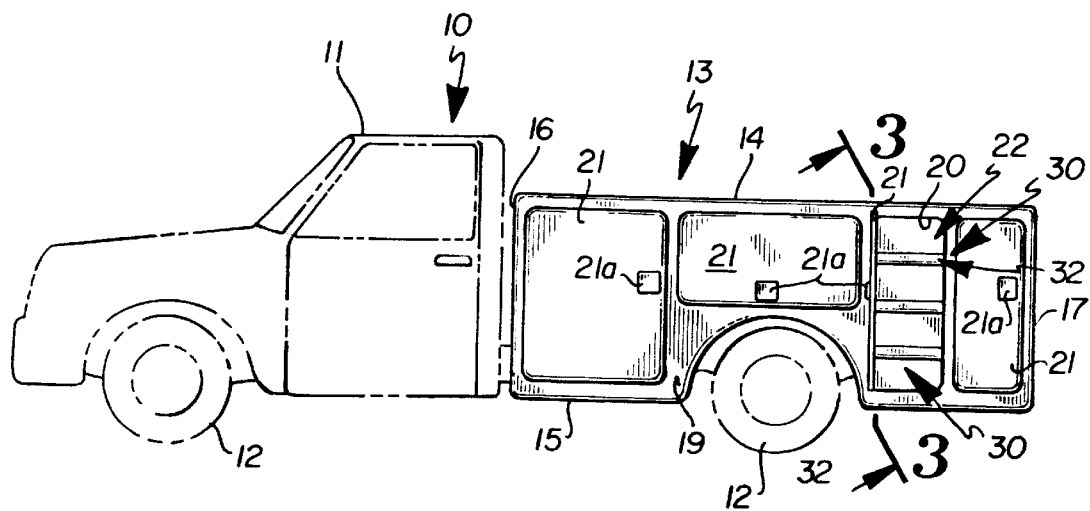
FIG. 1 is a side elevational view of a conventional pick-up truck having utility bodies mounted thereon.
FIG. 2 is a partially exploded perspective view of a shelf illustrating the details of construction thereof.

Referring now to the drawings and more particularly to FIG. 1, it will be seen that a conventional commercial pickup truck 10 is thereshown. The pick-up truck 10 includes a cab 11, wheels 12 and a pair of utility bodies 13 which are mounted on opposite side portions of the pick-up truck box. Although only one utility body 13 is seen in FIG. 1, it is pointed out that the pick-up truck box is provided with an identical utility body mounted on the opposite side.

The utility body 13 is of generally rectangular configuration and includes a top wall 14, a bottom wall 15, a front wall 16, rear wall 17, an inner side wall 18 and an outer side wall 19. The utility body 13 also has a plurality of compartments 20 therein which open outwardly through the outer side wall 19. Each compartment is provided with a door 21 having suitable door handle 21a. It will be noted that each compartment 20 is provided with continuous vertical and horizontal flanges 20a which define the access opening to the compartment.

Some or all of the compartments 20 are provided with shelf assemblies 22 which embody the novel invention. Each shelf assembly includes a pair of vertically disposed elongate metallic bracket strips 23 which are secured to each opposed side wall 29 of a compartment 20. Each bracket strip 23 is of U-shaped cross-sectional configuration and includes a central web portion 24 having opposed legs 25 integrally formed therewith. Each bracket strip also includes outwardly struck vertically spaced apart attachment hooks 26 integrally formed with the central web. Each bracket strip is secured to the associated side wall 29 of the compartment by screws 28 that engage in countersunk openings 27 in the web portion of a bracket strip.

The bracket strips 23 attached to each side wall 29 of each compartment are disposed in parallel relation and each bracket strip is preferably disposed in opposed relation with respect to a bracket strip on the opposite side wall The shelf assemblies 22 also includes a plurality of similar vertically spaced apart shelves 30 which are formed of a suitable fiberglass in a poltrusion operation. Each shelf 30 includes a substantially flat rectangular shaped support panel 31 having substantially straight transverse edges 31a and substantially straight longitudinal edges 31b. In the embodiment shown, the shelf 30 is provided with upturned vertically disposed front and rear walls 32 which extend upwardly from the longitudinal edges 31b. The front and rear walls are disposed in substantially parallel relation and each has a substantially straight top edge 32a, substantially straight vertical edges 32b, a front surface 32c and a rear surface 32d.

It will also be noted that the panel 31a has a substantially flat upper surface 31c and a substantially flat lower surface 31d. The panel 31 is also provided with a pair of transversely spaced apart elongate longitudinally extending convex strips 33 extending from one edge from the panel to the other edge of the panel. The front and rear vertical walls 32 each have an elongate substantially straight rounded convex strip 33 integrally formed therewith and extending throughout the length of the associated vertical wall. It will be noted that the wall convex strips and the panel convex strips are disposed in parallel relation with respect to each other. The convex strips on the panel and walls are molded in and are formed during the poltrusion operation. It will be noted that each wall convex strip 33 is provided with a plurality of longitudinally spaced apart transverse slots 35 therein and that the elongate rounded convex panel strips 34 are provided with longitudinally spaced apart transverse slots 36 therein. It will be noted that each slot 36 in each panel strip is disposed in aligned relation with a slot in the other panel strip and in aligned relation with a slot 35 in each of the wall strips.

Referring again to FIGS. 2 and 3 it will be seen that the panel 31 of each shelf is provided with a pair of transversely spaced apart openings 37 therethrough located adjacent each end edge 31a. Each shelf is provided with a pair of laterally spaced apart similar angle brackets 38 which are secured to the shelf and which provide a means for supporting the shelf on the bracket strips 23.

Each angle bracket 38 includes a horizontal element 39 and a vertical element 40. The horizontal element 39 of each angle bracket is provided with a pair of elongate slots 41 therein and each slot is disposed in registering relation with one of the openings 37. A bolt 42 extends through each opening 37 and slot 41 and is secured to the angle bracket by nut 43 and lock washer 44. The slots 41 allow adjustment of the brackets in a direction longitudinally of the associated shelf 30.

Each angle bracket is engagable with a pair of aligned attachment hooks 26 on the bracket strips and provide means for positioning each shelf in supported relation within a compartment. The shelves may be mounted on any set of aligned attachment hooks 26.

Each shelf is also provided with a plurality of substantially vertically disposed flat dividers 45 each having opposed longitudinal edges 46 and vertical or transverse edges 47. In the embodiment shown, the dividers are of rectangular relation but it is pointed out that the dividers may have other configurations. It will further be noted that each divider has a longitudinal edge positioned in the slots 36 of the panel strips and opposed vertical edges 27 positioned in the slots 35 of the wall strips. The slotted strips therefore provide a means of attaching and retaining the dividers on each shelf.

It will be noted that the dividers illustrated in FIG. 2 are of various sizes in terms of their respective vertical dimensions to indicate the variety of sizes and shapes the dividers may have. These dividers may also have an inclined upper wall and may be of the same size. The slotted convex strips 33 and 34 not only provide the means for attaching the dividers to each shelf, but also provide rigidity and in part reinforcement to the panel and walls of each shelf.

It will therefore be seen that I have provided the compartments of conventional utility bodies with novel adjustable shelving thereby increasing the utility of the compartments.

Thus it will be seen that I have provided novel shelving for utility track bodies which are adjustable and adaptable in a manner not possible with conventional utility bodies.

What is claimed is:

1. In a truck utility body for mounting on a pick-up type truck, the utility body having top, bottom, front, rear and inner and outer side walls, a plurality of compartments in the truck body opening outwardly through the outer side wall, each compartment having opposed side walls, a top and bottom walls, shelving for the compartments comprising a plurality of similar vertically spaced apart, horizontal shelves, each shelf being formed of poltruded fiberglass material and comprising a substantially flat, generally rectangular panel having a front and a rear wall integral therewith and extending upwardly therefrom, the panel of each shelf having a plurality of elongate substantially parallel spaced apart convex strips integrally formed therewith and extending throughout the length of the panel, each strip having a plurality of longitudinally spaced apart transverse slots therein, each of the front and rear wall of each shelf having an elongate convex strip integral with the inner surface of the wall and extending substantially throughout the length of the wall and substantially parallel to the convex strips of the panel, each convex wall strip having a plurality of longitudinally spaced apart slots therein, each slot in the convex wall strip being disposed in alignment with a slot in each convex panel strip and a slot in the convex wall strip of the other wall a plurality of vertically disposed elongate bracket strips secured to the opposed side walls of at least one of said plurality of compartments, each bracket strip having a plurality of vertically spaced apart attachment elements projecting therefrom, each shelf having bracket means secured to the panel and projecting downwardly therefrom and engaging the attachment elements of the bracket strips for supporting each shelf in horizontal position in a compartment, and a plurality of vertically disposed spaced apart dividers extending between the front and rear walls and engaging the slots in the walls strips and the panel strips to form each shelf into subcompartment.

2. The invention as defined in claim 1 wherein the convex strip on each of the front wall and the rear wall is located adjacent an upper edge thereof.

3. The invention as defined in claim 1 wherein said dividers are of flat, rectangular-shaped configuration.

4. The invention as defined in claim 1 wherein said bracket means includes a pair of angle brackets for supporting each shelf, means securing each shelf to the associated pair of angle brackets, each shelf being laterally adjustable relative to the associated pair of supporting angle brackets.

\* \* \* \* \*